(12) United States Patent
Meyer et al.

(10) Patent No.: US 9,735,657 B2
(45) Date of Patent: Aug. 15, 2017

(54) ACTUATOR

(71) Applicant: Aktiebolaget SKF, Göteborg (SE)

(72) Inventors: David S Meyer, Rosenau (FR); Patrick Uhri, Sissach (CH); Stefan Waldner, Hölstein (CH)

(73) Assignee: AKTIEBOLAGET SKF, Gothenburg (SE)

( * ) Notice: Subject to any disclaimer, the term of this patent is extended or adjusted under 35 U.S.C. 154(b) by 673 days.

(21) Appl. No.: 14/315,410

(22) Filed: Jun. 26, 2014

(65) Prior Publication Data

US 2015/0001999 A1 Jan. 1, 2015

(30) Foreign Application Priority Data

Jun. 26, 2013 (DE) ........................ 10 2013 212 209

(51) Int. Cl.
| | |
|---|---|
| *H02K 7/06* | (2006.01) |
| *H02K 11/00* | (2016.01) |
| *H02K 7/116* | (2006.01) |
| *F16H 25/20* | (2006.01) |

(52) U.S. Cl.
CPC ....... *H02K 11/001* (2013.01); *F16H 25/2015* (2013.01); *H02K 7/116* (2013.01); *F16H 2025/2053* (2013.01); *F16H 2025/2081* (2013.01)

(58) Field of Classification Search
CPC ......... H02K 11/001; H02K 1525/2015; H02K 7/116; H02K 7/06
USPC .................................................. 310/196, 37
See application file for complete search history.

(56) References Cited

U.S. PATENT DOCUMENTS

| 8,033,193 B2 * | 10/2011 | Malausa | ............ | F16H 25/2015 |
| | | | | 192/141 |
| 8,201,468 B2 | 6/2012 | Heinrichs | | |
| 2007/0147972 A1 * | 6/2007 | Malausa | ............ | F16H 25/2015 |
| | | | | 411/270 |
| 2012/0153755 A1 * | 6/2012 | Burckhard | ........... | B60N 2/0296 |
| | | | | 310/83 |

FOREIGN PATENT DOCUMENTS

| DE | 202007017535 U1 | 4/2009 |
| DE | 102011088683 A1 | 6/2012 |

* cited by examiner

*Primary Examiner* — Terrance Kenerly

(74) *Attorney, Agent, or Firm* — Bryan Peckjian; SKF USA Inc. Patent Dept.

(57) ABSTRACT

An actuator includes two abutment elements and an adjusting device for changing their spacing in a translational displacement direction. A support element is provided between the abutment elements, a drive motor is supported by the support element, a first spindle nut is rotatably supported by the support element, a second spindle nut is rotatably supported by the support element, a first spindle engages the first spindle nut and is connected to one abutment element, and a second spindle engages the second spindle nut and is connected to the other abutment element. Two limit switches are mounted on a switch support on the support element and spaced apart from each other in the translational displacement direction. A first limit switch actuating element is attached to one of the abutment elements, and a second limit switch actuating element is attached to one of the spindles.

19 Claims, 1 Drawing Sheet

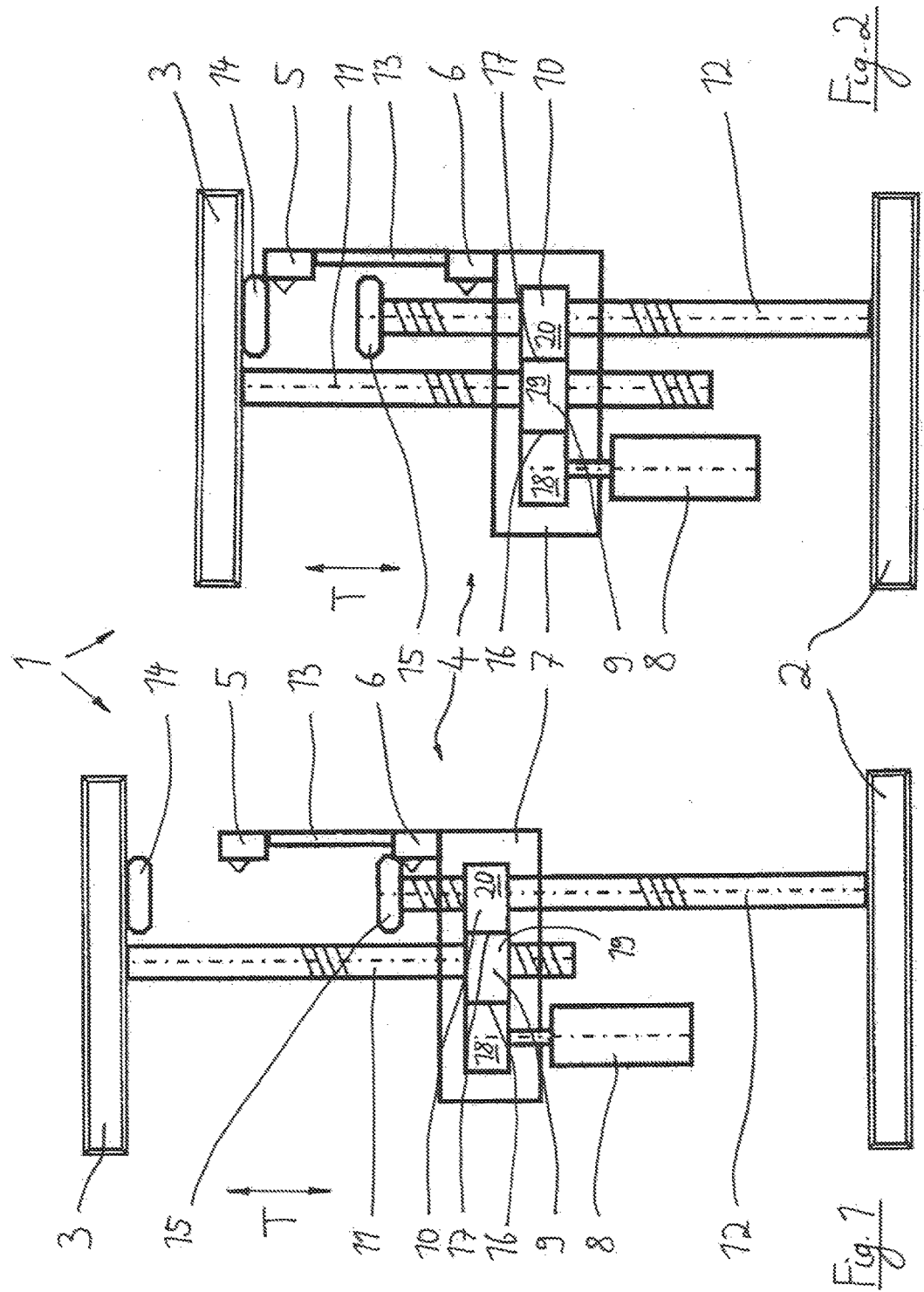

ACTUATOR

CROSS-REFERENCE

This application claims priority to German patent application No. 10 2013 212 209.8 filed on Jun. 26, 2013, the contents of which are fully incorporated herein by reference.

TECHNOLOGICAL FIELD

The disclosure relates to an actuator comprising a first abutment element and a second abutment element and an actuator for moving the second abutment element in a translational displacement direction relative to the first abutment element. The actuator also includes first and second limit switches.

BACKGROUND

Actuators are known that have a first abutment element and a second abutment element and an adjusting device for moving the second abutment element in a translational displacement direction relative to the first abutment element. Such adjusting devices may include a support element disposed between the two abutment elements in the displacement direction, a drive motor disposed on or in the support element, and a first spindle nut rotatably supported on or in the support element, which first spindle nut is rotationally driven by the drive motor. These devices may also include a second spindle nut rotatably supported on or in the support element, which second spindle nut is rotationally driven by the drive motor. A first spindle is in engagement with the first spindle nut and is fixedly connected to the one abutment element, and a second spindle is in engagement with the second spindle nut and is fixedly connected to the other abutment element. An actuator of this type is known from DE 10 2011 088 683 A1 (U.S. 2012/153755).

An adjusting device, e.g. a motor-driven spindle-nut system, moves an upper plate in a translational displacement direction relative to a base plate. Limit switches are provided in the region of the end positions of the movable plate in order to effect a switching-off of the drive motor before the movable plate strikes another component. In this way back-and-forth movement can be effected by the actuator in a low-wear manner.

DE 20 2007 017 535 U1 (U.S. Pat. No. 8,201,468) discloses an electromotive double drive for furniture and a switch assembly therefor.

A disadvantage in prior-art solutions is that the customization of the to-be-driven stroke or lifting range (length) of the movable plate and thus the corresponding arrangement of the limit switches is complex and/or expensive. Depending on the particular stroke or lifting range, the cabling/harnesses of the limit switches must be modified or adapted accordingly. Since the cables usually must extend inside the actuator, a corresponding complexity/expense is required for a neat or orderly routing of the cables. Changing the positions of the limit switches is thus complex and expensive in an actuator of the above-described type.

SUMMARY

The object of the disclosure is to further develop an actuator of the above-mentioned type such that a simpler customization to a desired stroke or lifting range is possible. This is to be achieved using a simple construction so that the actuator is manufacturable economically with a predetermined stroke or lifting range.

The solution of this object comprises the use of two limit switches in order to limit the translational displacement movement between the two abutment elements. The two limit switches are spaced in the translational displacement direction on a switch support, and the switch support is attached to a support element. A first actuating element for one of the two limit switches is attached to one of the abutment elements, and a second actuating element for the other of the two limit switches is attached to one of the spindles.

The first abutment element and/or the second abutment element are in this case preferably formed as plates, and the two spindles are preferably configured as threaded spindles having the same thread pitch.

The drive motor is configured to rotatably drive the first spindle nut via a first transmission element. The first spindle nut is configured to rotatably drive the second spindle nut via a second transmission element. Here the first and/or the second transmission element can be formed as a gear, in particular as a spur gear. The drive motor is preferably formed as an electric motor, and the support element is preferably formed as a plate.

The limit switches in this case are preferably in communication with the drive motor such that the drive motor switches off upon receiving a signal from one of the limit switches.

Although the nuts of the spindles help guide the two plates with respect to each other, at least one further guide element is preferably provided to further guide the two abutment elements relative to each other in the translational displacement direction.

By using the proposed design of an actuator of the above-described type, a construction which functions in a stable, rigid, and durable manner is achieved which is adjustable to a desired stroke or lifting range using relatively simple measures. In addition, the movement of the two plates (abutment elements) with respect to each other is precise. In this way not only can the number of components be reduced, but assembly thereof can also be simplified. The manufacture of the actuator is accordingly possible at lower cost.

BRIEF DESCRIPTION OF THE DRAWINGS

An exemplary embodiment of the disclosure is depicted in the drawings.

FIG. 1 is a schematic side elevational view of an actuator for moving an upper plate in a translational displacement direction relative to a base or lower plate with the upper plate in its uppermost position.

FIG. 2 is a schematic side elevational view of the actuator of FIG. 1, with the upper plate in its lowermost position.

DETAILED DESCRIPTION

An actuator 1 is depicted in the Figures. The actuator 1 includes a first abutment element 2 in the form of a base or lower plate as well as a second abutment element 3 in the form of an upper plate. The terms "base," and "lower," and "upper" are used herein for convenience to describe the relative positions of elements in the drawings and are not intended to limit the actuator to use in any particular orientation. The actuator may be used in other orientations in which, for example, the "upper" plate is located beneath or next to the "lower plate." The two plates 2, 3 are moved by the actuator in a translational displacement direction T relative to each other. If, for example, the base plate 2 is anchored to the floor, the upper plate 3 moves vertically upward or downward in the displacement direction T. In addition to the depicted elements, further guide elements (not illustrated) are provided which guide the upper plate 3 relative to the base plate 2 and help ensure a precise movement.

It is important that the actuator 1 automatically switch off when the upper plate 3 reaches its uppermost position or its lowermost position. In order to accomplish this, limit switches 5 and 6 are provided which are connected via a controller (not shown); the controller switches off a drive motor, described below, when the limit switches 5, 6 send appropriate signals.

An adjusting device 4 is provided for moving the upper plate 3 relative to the lower plate 2, which adjusting device 4, as described below, is formed in a specific manner. As a result, an adjustment of the actuator 1 to a defined stroke or lifting range can be achieved with relatively little complexity or expense of construction.

The central element of the adjusting device 4 is a support element 7 in the form of a support plate which is disposed between the base plate 2 and upper plate 3. As described below, the adjustment device 4 is configured such that the support plate 7 is always located midway between the base plate 2 and upper plate 3. A drive motor 8 is attached to the support plate 7, and two spindle nuts, a first spindle nut 9 and a second spindle nut 10, are rotatably supported in the support plate 7.

The drive motor 8 is provided with a spur gear 18, which together with a spur gear 19 forms a first transmission element 16. The spur gear 19 is disposed on the outer circumference of the first spindle nut 9. Accordingly the first spindle nut 9 is rotationally driven when the drive motor 8 operates.

The spur gear 19 further meshes with a spur gear 20 which is disposed on the outer circumference of the second spindle nut 10. The two spur gears 19, 20 form a second transmission element 17.

As can be seen from the Figures, the first and second spindle nuts 9 and 10 rotate in opposite directions when driven by the drive motor 8. The spur gears 18 and 19 have the same number of teeth, so the two spindle nuts 9 and 10 rotate at the same speed. In addition, the two spindle nuts 9, 10 have the same thread pitch.

The first spindle nut 9 is engaged with a first threaded spindle 11. The second spindle nut 10 is engaged with a second threaded spindle 12. The two threaded spindles 11, 12 also have the same thread pitch. The upper end of the first threaded spindle 11 is fixedly connected to the upper plate 3, i.e. it is axially and rotationally fixed thereto. The lower end of the second threaded spindle 12 is fixedly attached to the base plate 2.

Furthermore, a switch support 13 is attached to the support plate 7. The switch support 13 is rod-shaped and supports the two limit switches 5 and 6 in a spaced-apart manner.

Finally, a first actuator element 14 for the actuating of the upper limit switch 5 is disposed on the underside of the upper plate 3, and a second actuator element 15 for the actuating of the lower limit switch 6 is disposed on the upper axial end of the second spindle 12.

As can be seen by viewing the two Figures together, the following functionality is thus given:

The two spindle nuts 9 and 10 are rotationally driven in opposite directions by the drive motor 8. The spindles 11 and 12 move relative to their nuts 9 and 10, and due to the identically-sized thread pitches, move at the same speed and in opposite directions away from the support plate 7. Depending on the direction of rotation of the drive motor 8, the upper plate 3 is thus moved upwards or downwards relative to the base plate 2. The support plate 7 is always located equidistantly spaced from the two plates 2 and 3.

If the upper plate 3 is moved upward by the adjusting device 4, the second actuating element 15 reaches the limit switch 6 in the region of the desired upper end position of the upper plate 3, so that when the second actuating element 15 reaches the upper end position, the limit switch 6 switches off the drive motor 8. This is illustrated in FIG. 1.

On the other hand, if the upper plate 3 is moved downward by the adjusting device 4, the first actuating element 14 reaches the limit switch 5 in the region of the desired lower end position of the upper plate 3, so that when the first actuating element 14 reaches the lower end position, the limit switch 5 switches off the drive motor 8. This is shown in FIG. 2.

An adjusting of the actuator 1 to a desired stroke or lifting length (height) can be achieved in a simple manner with this design, e.g., by selecting an appropriate length of the spindles 11, 12 and/or of the switch support 13. For this purpose the spindles 11, 12 are formed with appropriate lengths, as is the switch support 13. Furthermore, no parts must be customized to a desired stroke or lifting range, which makes this process simple and economical.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved actuators.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Actuator
2 First abutment element (base plate)
3 Second abutment element (upper plate)
4 Adjusting device
5 Limit switch
6 Limit switch 7 Support element (support plate)
8 Drive motor
9 First spindle nut
10 Second spindle nut
11 First spindle
12 Second spindle
13 Switch support
14 First actuating element
15 Second actuating element
16 First transmission element
17 Second transmission element
18 Spur gear
19 Spur gear
20 Spur gear
T Translational displacement direction

What is claimed is:

1. An actuator comprising:
a first abutment element and a second abutment element, and
an adjusting device configured to move the second abutment element relative to the first abutment element in a translational displacement direction, wherein the adjusting device includes:
a support element disposed between the first and second abutment elements in the displacement direction,
a drive motor disposed on or in the support element,
a first spindle nut rotatably supported on or in the support element, in which first spindle nut is rotationally driven by the drive motor,
a second spindle nut rotatably supported on or in the support element, in which second spindle nut is rotationally driven by the drive motor,
a first spindle which is in engagement with the first spindle nut and which is fixedly connected to the first abutment element, and
a second spindle which is in engagement with the second spindle nut and is fixedly connected to the second abutment element,
wherein two limit switches are disposed so as to limit the translational displacement path between the two abutment elements, and
wherein the two limit switches are spaced in the translational displacement direction on a switch support, the switch support being attached to the support element, and
wherein a first actuating element for one of the two limit switches is attached to one of the abutment elements and wherein a second actuating element for the other of the two limit switches is attached to one of the spindles.

2. The actuator according to claim 1, wherein the first abutment element or the second abutment or the first abutment element and the second abutment element are formed as plates.

3. The actuator according to claim 1, wherein the two spindles are formed as threaded spindles and have the same thread pitch.

4. The actuator according to claim 1, wherein the drive motor rotatably drives the first spindle nut via a first transmission element.

5. The actuator according to claim 4, wherein the second spindle nut is rotatably driven by the first spindle nut via a second transmission element.

6. The actuator according to claim 4, wherein the first transmission element or the second transmission element or the first transmission element and the second transmission element is formed as a gear.

7. The actuator according to claim 1, wherein the drive motor is an electric motor.

8. The actuator according to claim 1 wherein the support element is a plate.

9. The actuator according to claim 1, wherein the limit switches are in communication with the drive motor, and wherein the drive motor is configured to switch off upon receiving a signal from one of the limit switches.

10. The actuator according to claim 1, further including at least one guide element configured to guide the two abutment elements relative to each other in the translational displacement direction.

11. The actuator according to claim 4, wherein the first transmission element or the second transmission element or the first transmission element and the second transmission element is a spur gear.

12. The actuator according to claim 1,
wherein the first abutment element or the second abutment or the first abutment element and the second abutment element are formed as plates,
wherein the two spindles are formed as threaded spindles and have the same thread pitch,
wherein the drive motor rotatably drives the first spindle nut via a first transmission element,
wherein the second spindle nut is rotatably driven by the first spindle nut via a second transmission element,
wherein the first transmission element or the second transmission element or the first transmission element and the second transmission element is formed as a gear, and
wherein the drive motor is an electric motor.

13. An actuator comprising:
a first abutment element,
a second abutment element spaced from the first abutment element and configured to be displaced from the first abutment element in a displacement direction,
a support element disposed between the first abutment element and the second abutment element,
a drive motor supported by the support element,
a first spindle nut rotatably supported by the support element and configured to be rotationally driven by the drive motor,
a second spindle nut rotatably supported by the support element and configured to be rotationally driven by the drive motor,
a first spindle in engagement with the first spindle nut and fixedly connected to the first abutment element,
a second spindle in engagement with the second spindle nut and fixedly connected to the second abutment element,
a switch support mounted on the support element,
first and second limit switches on the switch support spaced apart from one another in the displacement direction,
a first limit switch actuating element attached to one of the first and second abutment elements and a second limit switch actuating element attached to one of the first and second spindles.

14. The actuator according to claim 13, wherein the first limit switch actuating element is attached to the second abutment element and the second limit switch actuating element is attached to the second spindle.

15. The actuator according to claim 14, wherein the first limit switch is intersected by a first plane perpendicular to a longitudinal axis of the first spindle, the second limit switch is intersected by a second plane perpendicular to the longitudinal axis of the first spindle and wherein the second limit switch actuating element is always located at least partially between the first plane and the second plane.

16. The actuator according to claim 15, wherein at least part of the first limit switch actuating element is always located in a space not between the first plane and the second plane.

17. The actuator according to claim 13, wherein a distance between the first limit switch and the second limit switch remains constant when the second abutment element is displaced relative to the first abutment element.

18. The actuator according to claim 13, wherein the switch support is located between the support element and the second abutment element.

19. An actuator comprising:
a first abutment element,
a second abutment element spaced from the first abutment element and configured to be displaced from the first abutment element in a displacement direction,
a support element disposed between the first abutment element and the second abutment element,
a drive motor supported by the support element,
a first spindle nut rotatably supported by the support element and configured to be rotationally driven by the drive motor,
a second spindle nut rotatably supported by the support element and configured to be rotationally driven by the drive motor,
a first spindle in engagement with the first spindle nut and fixedly connected to the first abutment element,
a second spindle in engagement with the second spindle nut and fixedly connected to the second abutment element, and
limit means for limiting movement of the second abutment element relative to the first abutment element.

* * * * *